US007822870B1

(12) United States Patent  
Chandrasekaran et al.

(10) Patent No.: US 7,822,870 B1
(45) Date of Patent: Oct. 26, 2010

(54) METHOD AND MECHANISM FOR PREDICTING DATA CONFLICTS AND GENERATING A LOAD DISTRIBUTION PLAN IN A MULTI-NODE SYSTEM

(75) Inventors: Sashikanth Chandrasekaran, Belmont, CA (US); Chiyeh Hou, Pleasanton, CA (US); Tak F. Wang, Hayward, CA (US)

(73) Assignee: Oracle International Corporation, Redwood Shores, CA (US)

( * ) Notice: Subject to any disclaimer, the term of this patent is extended or adjusted under 35 U.S.C. 154(b) by 994 days.

(21) Appl. No.: 09/872,891

(22) Filed: May 31, 2001

(51) Int. Cl.
*G06F 15/16* (2006.01)
*G06F 15/173* (2006.01)
*G06F 9/46* (2006.01)

(52) U.S. Cl. ................ 709/234; 709/224; 709/238; 718/106

(58) Field of Classification Search ......... 709/223–225, 709/234, 235, 238; 718/106
See application file for complete search history.

(56) References Cited

U.S. PATENT DOCUMENTS

| | | | | |
|---|---|---|---|---|
| 5,271,000 | A | * | 12/1993 | Engbersen et al. .......... 370/244 |
| 5,657,450 | A | * | 8/1997 | Rao et al. .................. 707/10 |
| 5,664,151 | A | * | 9/1997 | Galles et al. ............... 711/145 |
| 5,819,033 | A | * | 10/1998 | Caccavale .................. 709/224 |
| 5,928,344 | A | * | 7/1999 | Stierli ....................... 710/105 |
| 5,937,165 | A | * | 8/1999 | Schwaller et al. ........... 709/224 |
| 6,154,813 | A | * | 11/2000 | Martin et al. ............... 711/133 |
| 6,405,257 | B1 | * | 6/2002 | Gersht et al. ............... 709/235 |
| 6,427,166 | B1 | * | 7/2002 | Hurst et al. ................. 709/220 |
| 6,442,564 | B1 | * | 8/2002 | Frey et al. ................. 707/103 R |
| 6,542,930 | B1 | * | 4/2003 | Auvenshine ................ 709/224 |
| 6,681,251 | B1 | * | 1/2004 | Leymann et al. ............ 709/226 |
| 6,687,735 | B1 | | 2/2004 | Logston et al. |
| 6,691,067 | B1 | * | 2/2004 | Ding et al. ................. 702/186 |
| 6,963,899 | B1 | | 11/2005 | Fernandez et al. |
| 7,467,387 | B2 | | 12/2008 | Mayes et al. |

OTHER PUBLICATIONS

Gordon Smith, et al., Oracle Corporation "Oracle Database 10g Services, An Oracle White Pager", Nov. 2003, pp. 1-11.
Ruth Baylis, et al., Oracle Corporation, "Oracle Database Administrator's Guide 10g Relearse 1 (10.1) Part No. B10739-01", Dec. 2003, pp. 1-1078. Part 1 of 22.
Ruth Baylis, et al., Oracle Corporation, "Oracle Database Administrator's Guide 10g Relearse 1 (10.1) Part No. B10739-01", Dec. 2003, pp. 1-1078. Part 2 of 22.
Ruth Baylis, et al., Oracle Corporation, "Oracle Database Administrator's Guide 10g Relearse 1 (10.1) Part No. B10739-01", Dec. 2003, pp. 1-1078. Part 3 of 22.

(Continued)

*Primary Examiner*—Ario Etienne
*Assistant Examiner*—Avi Gold
(74) *Attorney, Agent, or Firm*—Vista IP Law Group, LLP.

(57) ABSTRACT

A system and method for estimating data conflicts in a multi-node system is disclosed. According to an embodiment of the invention, tracing the execution of a workload on a single node and analyzing the trace records makes it possible to predict how many data conflicts would occur if the workload were executed across multiple nodes. Also disclosed is a method and mechanism for generating a load distribution plan for a multi-node system.

66 Claims, 6 Drawing Sheets

OTHER PUBLICATIONS

Ruth Baylis, et al., Oracle Corporation, "Oracle Database Administrator's Guide 10g Relearse 1 (10.1) Part No. B10739-01", Dec. 2003, pp. 1-1078. Part 4 of 22.
Ruth Baylis, et al., Oracle Corporation, "Oracle Database Administrator's Guide 10g Relearse 1 (10.1) Part No. B10739-01", Dec. 2003, pp. 1-1078. Part 5 of 22.
Ruth Baylis, et al., Oracle Corporation, "Oracle Database Administrator's Guide 10g Relearse 1 (10.1) Part No. B10739-01", Dec. 2003, pp. 1-1078. Part 6 of 22.
Ruth Baylis, et al., Oracle Corporation, "Oracle Database Administrator's Guide 10g Relearse 1 (10.1) Part No. B10739-01", Dec. 2003, pp. 1-1078. Part 7 of 22.
Ruth Baylis, et al., Oracle Corporation, "Oracle Database Administrator's Guide 10g Relearse 1 (10.1) Part No. B10739-01", Dec. 2003, pp. 1-1078. Part 8 of 22.
Ruth Baylis, et al., Oracle Corporation, "Oracle Database Administrator's Guide 10g Relearse 1 (10.1) Part No. B10739-01", Dec. 2003, pp. 1-1078. Part 9 of 22.
Ruth Baylis, et al., Oracle Corporation, "Oracle Database Administrator's Guide 10g Relearse 1 (10.1) Part No. B10739-01", Dec. 2003, pp. 1-1078. Part 10 of 22.
Ruth Baylis, et al., Oracle Corporation, "Oracle Database Administrator's Guide 10g Relearse 1 (10.1) Part No. B10739-01", Dec. 2003, pp. 1-1078. Part 11 of 22.
Ruth Baylis, et al., Oracle Corporation, "Oracle Database Administrator's Guide 10g Relearse 1 (10.1) Part No. B10739-01", Dec. 2003, pp. 1-1078. Part 12 of 22.
Ruth Baylis, et al., Oracle Corporation, "Oracle Database Administrator's Guide 10g Relearse 1 (10.1) Part No. B10739-01", Dec. 2003, pp. 1-1078. Part 13 of 22.
Ruth Baylis, et al., Oracle Corporation, "Oracle Database Administrator's Guide 10g Relearse 1 (10.1) Part No. B10739-01", Dec. 2003, pp. 1-1078. Part 14 of 22.
Ruth Baylis, et al., Oracle Corporation, "Oracle Database Administrator's Guide 10g Relearse 1 (10.1) Part No. B10739-01", Dec. 2003, pp. 1-1078. Part 15 of 22.
Ruth Baylis, et al., Oracle Corporation, "Oracle Database Administrator's Guide 10g Relearse 1 (10.1) Part No. B10739-01", Dec. 2003, pp. 1-1078. Part 16 of 22.
Ruth Baylis, et al., Oracle Corporation, "Oracle Database Administrator's Guide 10g Relearse 1 (10.1) Part No. B10739-01", Dec. 2003, pp. 1-1078. Part 17 of 22.
Ruth Baylis, et al., Oracle Corporation, "Oracle Database Administrator's Guide 10g Relearse 1 (10.1) Part No. B10739-01", Dec. 2003, pp. 1-1078. Part 18 of 22.
Ruth Baylis, et al., Oracle Corporation, "Oracle Database Administrator's Guide 10g Relearse 1 (10.1) Part No. B10739-01", Dec. 2003, pp. 1-1078. Part 19 of 22.
Ruth Baylis, et al., Oracle Corporation, "Oracle Database Administrator's Guide 10g Relearse 1 (10.1) Part No. B10739-01", Dec. 2003, pp. 1-1078. Part 20 of 22.
Ruth Baylis, et al., Oracle Corporation, "Oracle Database Administrator's Guide 10g Relearse 1 (10.1) Part No. B10739-01", Dec. 2003, pp. 1-1078. Part 21 of 22.
Ruth Baylis, et al., Oracle Corporation, "Oracle Database Administrator's Guide 10g Relearse 1 (10.1) Part No. B10739-01", Dec. 2003, pp. 1-1078. Part 22 of 22.
Michele Cyran, et al., Oracle Corporation, "Oracle Database Concepts 10g Release 1 (10.1) Part No. B10743-01", Dec. 2003, pp. 1-732. Part 1 of 15.
Michele Cyran, et al., Oracle Corporation, "Oracle Database Concepts 10g Release 1 (10.1) Part No. B10743-01", Dec. 2003, pp. 1-732. Part 2 of 15.
Michele Cyran, et al., Oracle Corporation, "Oracle Database Concepts 10g Release 1 (10.1) Part No. B10743-01", Dec. 2003, pp. 1-732. Part 3 of 15.
Michele Cyran, et al., Oracle Corporation, "Oracle Database Concepts 10g Release 1 (10.1) Part No. B10743-01", Dec. 2003, pp. 1-732. Part 4 of 15.
Michele Cyran, et al., Oracle Corporation, "Oracle Database Concepts 10g Release 1 (10.1) Part No. B10743-01", Dec. 2003, pp. 1-732. Part 5 of 15.
Michele Cyran, et al., Oracle Corporation, "Oracle Database Concepts 10g Release 1 (10.1) Part No. B10743-01", Dec. 2003, pp. 1-732. Part 6 of 15.
Michele Cyran, et al., Oracle Corporation, "Oracle Database Concepts 10g Release 1 (10.1) Part No. B10743-01", Dec. 2003, pp. 1-732. Part 7 of 15.
Michele Cyran, et al., Oracle Corporation, "Oracle Database Concepts 10g Release 1 (10.1) Part No. B10743-01", Dec. 2003, pp. 1-732. Part 8-15.
Michele Cyran, et al., Oracle Corporation, "Oracle Database Concepts 10g Release 1 (10.1) Part No. B10743-01", Dec. 2003, pp. 1-732. Part 9 of 15.
Michele Cyran, et al., Oracle Corporation, "Oracle Database Concepts 10g Release 1 (10.1) Part No. B10743-01", Dec. 2003, pp. 1-732. Part 10 of 15.
Michele Cyran, et al., Oracle Corporation, "Oracle Database Concepts 10g Release 1 (10.1) Part No. B10743-01", Dec. 2003, pp. 1-732. Part 11 of 15.
Michele Cyran, et al., Oracle Corporation, "Oracle Database Concepts 10g Release 1 (10.1) Part No. B10743-01", Dec. 2003, pp. 1-732. Part 12 of 15.
Michele Cyran, et al., Oracle Corporation, "Oracle Database Concepts 10g Release 1 (10.1) Part No. B10743-01", Dec. 2003, pp. 1-732. Part 13 of 15.
Michele Cyran, et al., Oracle Corporation, "Oracle Database Concepts 10g Release 1 (10.1) Part No. B10743-01", Dec. 2003, pp. 1-732. Part 14 of 15.
Michele Cyran, et al., Oracle Corporation, "Oracle Database Concepts 10g Release 1 (10.1) Part No. B10743-01", Dec. 2003, pp. 1-732. Part 15 of 15.

* cited by examiner

METHOD AND MECHANISM FOR PREDICTING DATA CONFLICTS AND GENERATING A LOAD DISTRIBUTION PLAN IN A MULTI-NODE SYSTEM

BACKGROUND AND SUMMARY

One decision faced by organizations seeking to implement computer systems is whether to utilize computing at a single computer node versus computing at a plurality of distributed or clustered nodes. For example, many database systems can be configured to operate either at a single computer node (e.g., using shared-memory multi-processor architectures) or at a cluster of networked nodes. When implementing databases on a cluster of nodes, it is possible that multiple users on a plurality of different nodes may access the same data across the network.

The "workload" being handled by the computer software/system could result in markedly different system performance characteristics depending upon whether it is implemented using a single node or multi-node architecture. Under certain circumstances, considerable performance speed-up or scale-up can be achieved by migrating a workload from a single node to a cluster of nodes. Distributed load-balancing is one example of a performance advantage provided by distributed computing.

However, it is also possible that migrating a workload to a distributed multi-node system will create performance problems. For example, consider a distributed database system in which data that normally resides on a single node is distributed across a plurality of nodes and users at the distributed nodes seek to access the same set of data. A first user at a first node may seek to access the same exact database object as a second user at a second node. If the users at both nodes retrieve the database object, the cache at both nodes will each contain a version of that database object. Any changes to the database object made at a first node must be recognized at a second node to avoid data conflicts. Maintaining cache consistency in order to avoid data conflicts is an important task that typically involves some form of inter-nodal communication across the distributed system. Such communications across a network, however, could be orders of magnitude more expensive than similar types of communications within a single node. The greater the number of such data conflicts, the greater the communications overhead to ensure cache consistency. Hence, the additional cost to resolve actual or possible data conflicts could affect performance of a workload when migrated to a distributed system.

Before migrating a workload from a single node to multiple nodes, it is useful to make a determination of which architecture will provide the greatest performance benefits. There could be a disincentive to migrate if the expense of performing cache consistency operations outweighs the performance advantages of operating in a multi-node distributed environment.

One approach to estimating workload behavior when migrating to a multi-node environment is to examine the source code of software applications. A significant drawback with this approach is that great effort and expertise are needed to perform this type of analysis, particularly for large or complex application code. Another drawback is that the application source code is usually unavailable to end-user organizations because many computer applications are pre-packaged or purchased third-party applications. Moreover, this approach produces only a rough estimate that may or may not correspond to real world results.

Another approach is to actually observe the same workload in both the single node and multi-node environments. In this approach, an organization will separately implement an application into both computer architectures. Real-world test results from executing the workload on both architectures may validate whether any benefits exist for migrating to a multi-node environment. The drawback with this approach is the extra expenditure of resources needed to implement both architectures. It would be more cost effective to make the cost/benefit determination before making this investment.

To address these and other problems, the present invention is directed to a method and mechanism that is applicable to evaluating the performance of a workload in both a single node and multi-node system. An aspect of the invention is directed to a system and method for estimating data conflicts in a multi-node system. According to an embodiment of the invention, tracing the execution of a workload on a single node and analyzing the trace records makes it possible to predict how many data conflicts would occur if the workload were executed across multiple nodes under a given data distribution scheme. Also disclosed is a method and mechanism for generating a load distribution plan for a multi-node system. Further details of aspects, objects, and advantages of the invention are described below in the detailed description, drawings, and claims.

BRIEF DESCRIPTION OF THE DRAWINGS

The accompanying drawings are included to provide further understanding of the invention, and together with the Detailed Description, serve to explain the principles of the invention.

DETAILED DESCRIPTION

The present invention is directed to a method and mechanism applicable for evaluating the performance of a workload in both a single node and multi-node system. An aspect of the invention is directed to a system and method for estimating data conflicts and optimizing load distribution in a multi-node system. According to an embodiment of the invention, tracing the execution of a workload on a single node and analyzing the traces makes it possible to predict how many data conflicts would occur if the workload was executed across multiple nodes.

According to an embodiment of the invention, when deciding whether to migrate to a distributed architecture, one could factor in possible increases in overhead costs to discover the true speed-up or scale-up that could be obtained. Workloads which result in greater frequency of data conflicts may not perform well in a distributed architecture because of increased communications costs for maintaining cache consistency. Consequently it is desirable to provide to a mechanism to estimate the number of data conflicts that would occur during execution of a workload in a distributed environment. Additionally, it is useful to determine how to distribute the workload across a cluster so as to reduce the number of data conflicts.

Figure 1:
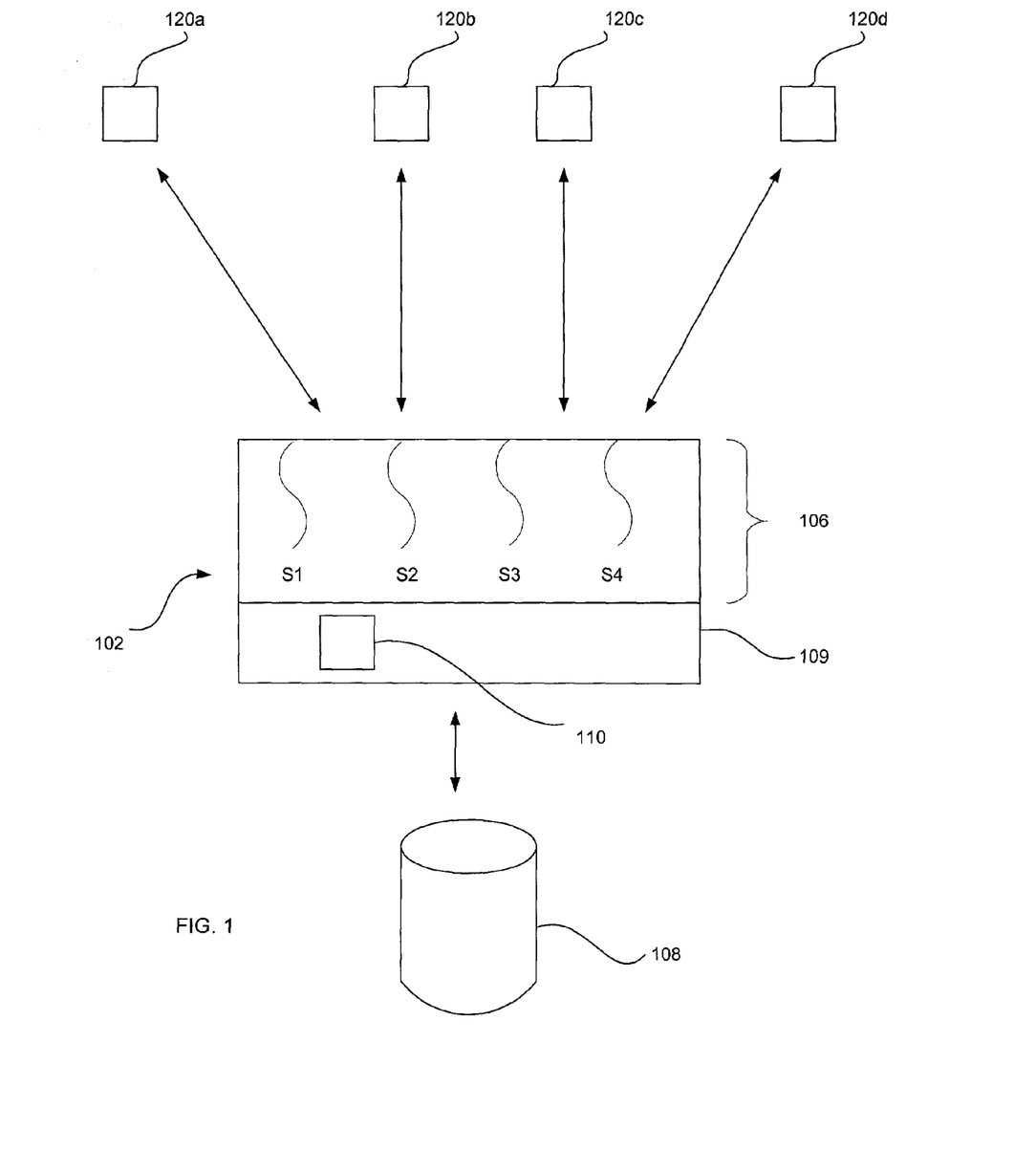
FIG. 1 depicts an example of a single-node system.

Referring to FIG. 1, shown is a single node 102 executing a workload that is connected to a database 108. The connection from node 102 to database 108 may be according to any known technique, e.g., via a network connection. The workload consists of one or more applications that are accessed or operated through one or more execution sessions 106 (e.g., sessions $S_1$-$S_4$). A plurality of users may access node 102 through clients 120a-d. Each remote user is associated with one of the sessions 106. Node 102 provides each session 106 with access to system memory 109 that includes a cache 110 for temporary storage of data.

Figure 2:
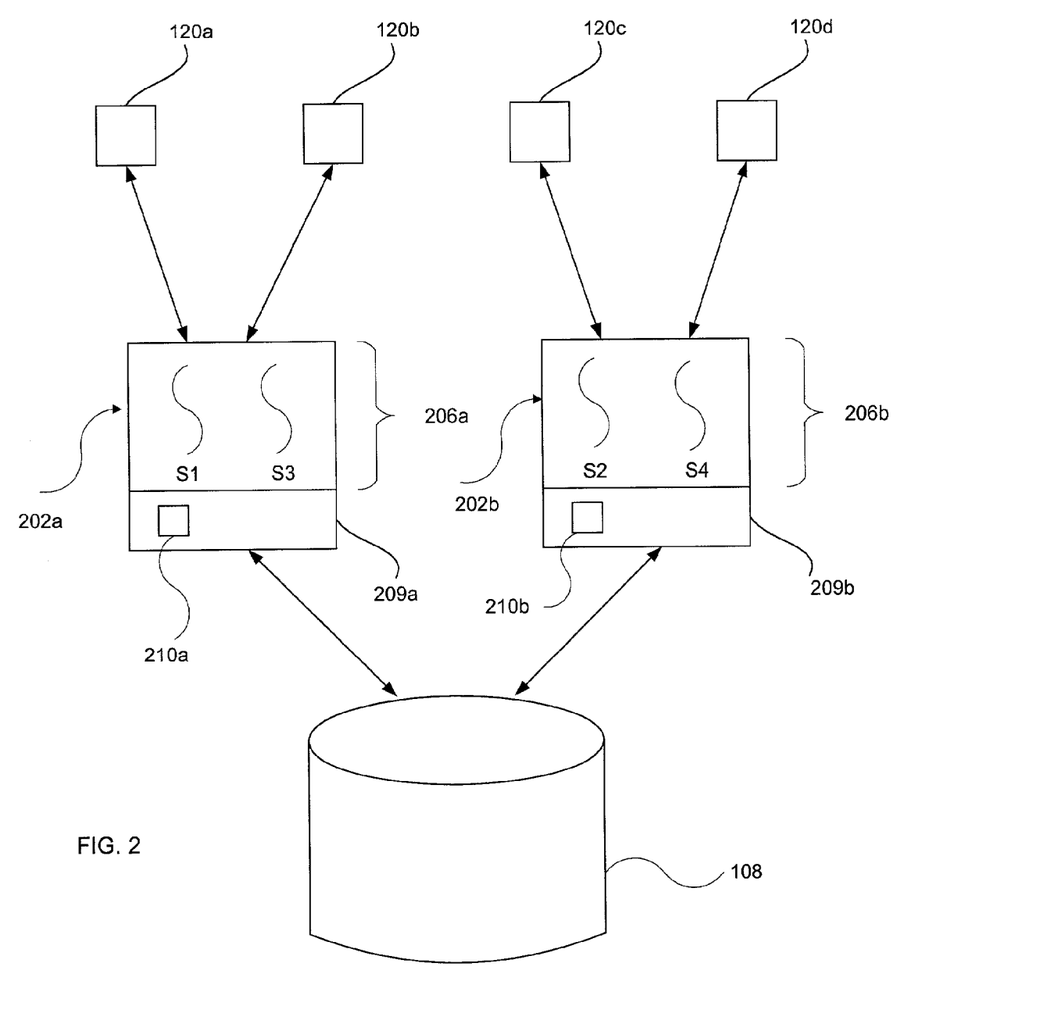
FIG. 2 depicts an example of a multi-node system.

FIG. 2 depicts the system of FIG. 1 after migration to a multi-node system. For illustrative purposes, this system comprises two separate nodes 202a and 202b, with each node maintaining memories 209a and 209b having caches 210a and 210b, respectively. Note that the clients 120a-d accessing database 108 through a single node 102 in FIG. 1 has been subdivided among nodes 202a and 202b in FIG. 2. One of the advantages of a distributed, multi-node architecture is that a workload can be distributed across multiple computer nodes, thereby reducing performance bottlenecks and increasing parallelism, load-balancing, and scalability. One way to accomplish these performance advantages is to distribute client accesses across different nodes in the multi-node system. Thus, clients 120a and 120b are shown accessing the first node 202a while clients 120c and 120d are shown accessing the second node 202b. In addition, the work handled through the original sessions 106 in the single node 102 are also redistributed to sessions 206a and 206b when migrating to the multi-node environment. Thus, sessions $S_1$-$S_4$ shown in node 102 of FIG. 1 have been subdivided such that the work performed by sessions $S_1$ and $S_3$ are distributed to node 202a and the work performed by sessions $S_2$ and $S_4$ are distributed to node 202b.

When a node retrieves a data object from database 108, a copy of the data object is cached at the node so that later requests for the same data do not require redundant retrievals. If multiple nodes retrieve the same data object, then copies of the data object may appear in multiple caches. In a multi-node shared-disk architecture, the data object could be modified anywhere across the multi-node system and the modification is "committed" and saved back to the database 108. Cached copies of the data object could become invalid or inconsistent if not updated to reflect changes when the data object is persistently changed and committed elsewhere across the distributed system.

For example, suppose session $S_1$ at node 202a retrieves a data block from database 108 having the value "A" and this data block is saved into cache 210a. Suppose session $S_2$ at node 202b subsequently changes the value of the data block from "A" to "B" and commits this change. A session at node 202a should not later access an un-updated version of the data block stored in cache 210a since it no longer represents the true state of the data block. In a multi-node architecture, databases may utilize inter-nodal communications to resolve these cache consistency issues. These inter-nodal communications are referred to herein as "block pings." Examples of block pings include inter-nodal shared-disk operations and interconnects. Note that inter-nodal communications are not normally required if multiple sessions within the same node make subsequent changes to a cached data object, since intra-node communications would be sufficient in this circumstance to resolve cache consistency issues.

Figure 3:
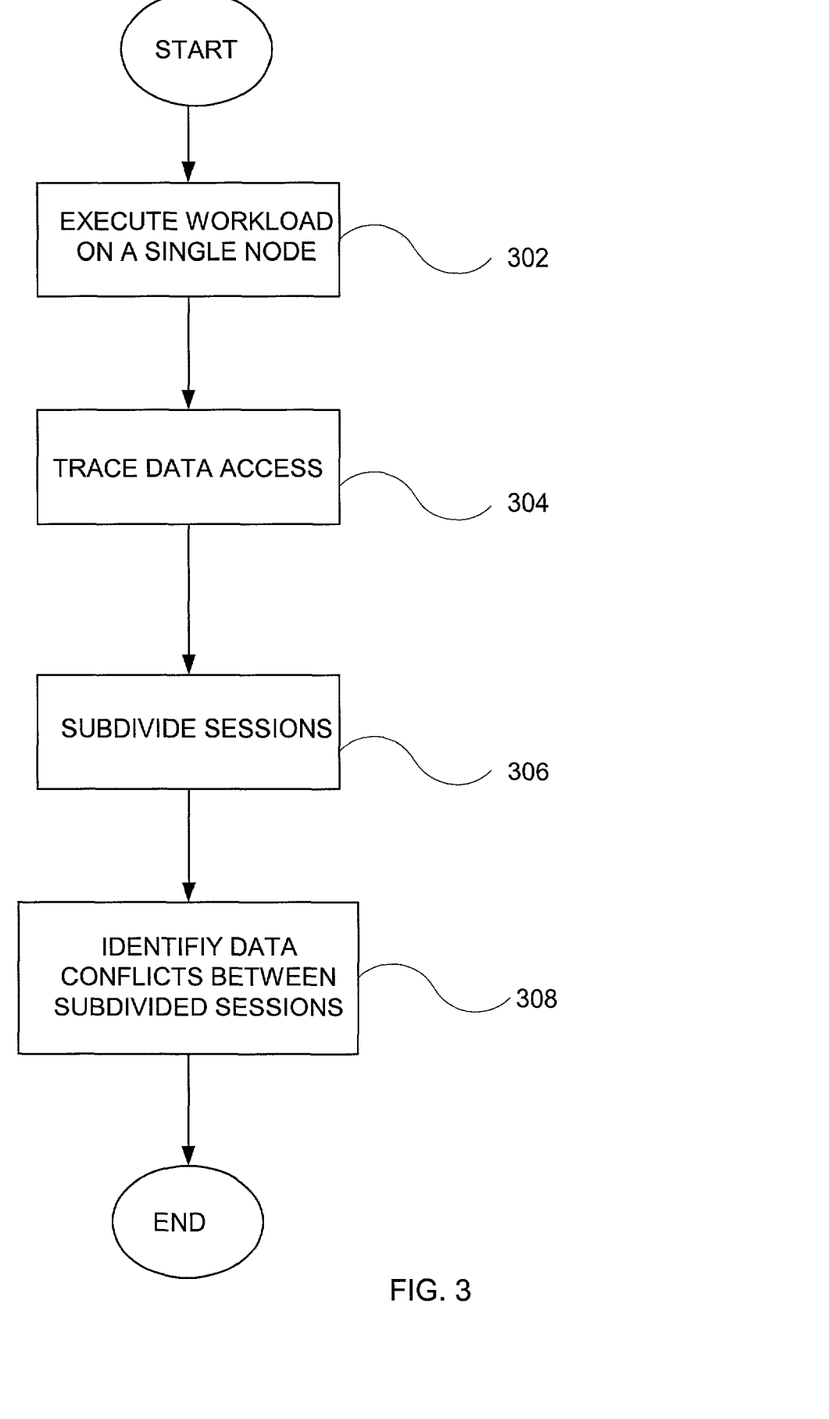
FIG. 3 depicts a flowchart of a method for predicting data conflicts according to an embodiment of the invention.

FIG. 3 depicts a flowchart of an embodiment of the invention for predicting data conflicts if a workload is migrated from a single node architecture to a multi-node architecture. Consistent with the invention, data conflicts are predicted by executing a workload on a single node (302), and tracing the operations performed by various workload entities on the single node, e.g., sessions, to determine probable data conflicts if the same workload is executed across multiple nodes (304).

Operations executed by the sessions are tracked to trace all access operations performed against data objects by each session. Since it is known that the work performed by the sessions on a node in a single node architecture will be subdivided among multiple nodes in a multi-node architecture, the present invention subdivides the identified sessions based upon the anticipated number of nodes in the multi-node system (306). This simulates the type of load distribution that is actually performed when migrating a workload from a single node to multiple nodes. Some examples of load distribution algorithms that may be employed include random, hash-based, or round-robin assignments of sessions to different nodes. Where the number of nodes are few, load distribution can be performed using modulo division to divide the sessions into modulo classes. Each modulo class represents a node within the cluster. For example, for a two-node cluster, the first modulo class (or node) would contain sessions S1, S3, S5 etc. and the second, sessions S2, S4, S6 etc. Generally, the number of anticipated nodes corresponds to the number of groups for which the sessions are sub-divided.

For example, the group of sessions $S_1$-$S_4$ at node 102 in FIG. 1 would be divided into two separate groups of sessions if the anticipated multi-node system includes two nodes as shown in FIG. 2. If a round-robin load distribution scheme is employed, then each session in the original group of sessions are assigned in round-robin order to two separate subset groups corresponding to nodes 202a and 202b. Thus, session $S_1$ is assigned to the first node 202a, session $S_2$ is assigned to the second node 202b, session $S_3$ is assigned to the first node 202a, and session $S_4$ is assigned to the second node 202b. In effect, the invention attempts to predict data conflicts based upon the assumption that if the workload of FIG. 1 is migrated to a multi-node system as shown in FIG. 2, then the work performed by sessions $S_1$ and $S_3$ would be distributed to node 202a and that the work performed by sessions $S_2$ and $S_4$ would be distributed to node 202b.

The next step is to analyze the trace records to identify potential data conflicts that would potentially cause a block ping (308). Different database systems have differing standards regarding what constitutes a "data conflict" For the purposes of this example, a "write" access performed by a session at a first node causes a data conflict with either a "write" or "read" access that occurs on another node. However, a "read" access at a first node will not cause a data conflict with another "read" access at a second node.

Consider if a trace of the workload's execution on a single node 102 revealed the following:

| Time of Access | Session Making Access | Mode of Access | Data Block Accessed |
| --- | --- | --- | --- |
| 1000 | $S_1$ | Read | 200 |
| 1050 | $S_2$ | Write | 200 |
| 1100 | $S_1$ | Read | 200 |
| 1150 | $S_3$ | Write | 200 |
| 1200 | $S_1$ | Read | 200 |

Assume that the sessions on single node 102 are subdivided for a 2-node system using modulo division such that a first modulo class includes sessions $S_1$ and $S_3$ and a second modulo class includes sessions $S_2$ and $S_4$. As noted above, it is assumed that the two sessions likely to be running in the same node in a 2-node system also belong to the same modulo class. Thus, sessions $S_1$ and $S_3$ correspond to a first node and sessions $S_2$ and $S_4$ correspond to a second node.

The above trace record is analyzed to determine whether any data conflicts would occur if the workload/sessions is divided as stated in the previous paragraph. Even though the above trace record was performed on a single node, it is analyzed as if the session operations were performed on different nodes. The following represents some analysis steps that may be performed to identify data conflicts:

1. Session S1 at a first node performs a read access of data block 200 at time 1000. Thus, the cache at the first node contains a version of data block 200 current as of time 1000.
2. At time 1050, session S2 at a second node performs a write access to data block 200. In an embodiment, a write lock is acquired by the second node so that the first node releases its read lock. At this point, the version of block 200 stored in the cache at the first node is no longer current. If the first node still holds a copy of data block 200 in its cache then a data conflict could exist. To prevent data inconsistencies if session S1 attempts to read or write to block 200, the data conflict is resolved using an inter-nodal block ping (which occurs at time 1100 in this example).
3. At time 1100, the session S1 at the first node attempts another read access of block 200. If a block-ping has not already occurred because of the data conflict from time 1050, then a data conflict occurs between the present read access and the previous write access by session S2 at time 1050. An inter-nodal block ping occurs to resolve the cache consistency problem. The cache at the first node is updated with the most current version of data block 200.
4. At time 1150, session S3 at the first node performs a write access of data block 200. S1 and S3 are located at the same node, thus no inter-nodal communications are needed to coordinate cache consistency between these two sessions. Since there have been no other intervening changes or reads of this data block on other nodes since it was last updated in the cache at the first node, no data conflict occurs. Thus, session S3 may directly access the version of data block 200 locally stored in cache.
5. At time 1200, session S1 at the first node performs a read access of data block 200. Since there have been no other intervening changes or reads of this data block on other nodes since it was last updated in the cache at the first node, no data conflict occurs. Thus, session S1 may directly access the version of data block 200 locally stored in cache.

By analyzing the traces in this fashion, it is possible to predict the number of data conflicts that would occur in a multi-node distributed environment. The predicted number of data conflicts is a indicating factor that is applicable to be used to determine the suitability of a particular workload for migration to a multi-node system. If an excessive number of data conflicts is predicted for a given workload, then it is possible that an excessive amount of network traffic would be required to maintain cache consistency. Under this circumstance, it can be predicted that the additional costs of maintaining consistency in a multi-node environment would detract from the potential benefits of executing across multiple nodes. On the other hand, if the predicted number of data conflicts is not excessive, then this workload could potentially benefit from distributed execution.

To illustrate, the above trace record can also be used to calculate the number of data conflicts if the workload is migrated to a 3-node system. Assume that the sessions on single node 102 are subdivided for a 3-node system using modulo division such that a first modulo class includes sessions $S_1$ and $S_4$, a second modulo class includes sessions $S_2$, and a third modulo class includes session $S_3$. As noted above, it is assumed that the sessions likely to be running in the same node in a multi-node system also belong to the same modulo class. Thus, sessions $S_1$ and $S_4$ correspond to a first node, session $S_2$ corresponds to a second node, and session $S_3$ corresponds to a third node.

To illustrate, the above trace record can also be used to calculate the number of data conflicts if the workload is migrated to a 3-node system. Assume that the sessions on single node 102 are subdivided for a 3-node system using modulo division such that a first modulo class includes sessions $S_1$ and $S_4$, a second modulo class includes sessions $S_2$, and a third modulo class includes session $S_3$. As noted above, it is assumed that the sessions likely to be running in the same node in a multi-node system also belong to the same modulo class. Thus, sessions $S_1$ and $S_4$ correspond to a first node, session $S_2$ corresponds to a second node, and session $S_4$ corresponds to a third node.

The above trace record is analyzed to determine whether any data conflicts would occur if the workload/sessions is divided in a manner corresponding to a migration to a 3-node system. The following represents some analysis steps that may be performed to identify data conflicts:

1. Session S1 at a first node performs a read access of data block 200 at time 1000. Thus, the cache at the first node contains a version of data block 200 current as of time 1000.
2. At time 1050, session S2 at a second node performs a write access to data block 200. In an embodiment, messages are sent so that the second node obtains a write lock and the first node releases its read lock. At this point, the version of block 200 stored in the cache at the first node is no longer current. If the first node still holds a copy of data block 200 in its cache then a data conflict could exist. To prevent data inconsistencies if session S1 attempts to read or write to block 200, the data conflict is resolved using an inter-nodal block ping (which occurs at time 1100 in this example).
3. At time 1100, the session S1 at the first node attempts another read access of block 200. In an embodiment, data conflict occurs between the present read access and the previous write access by session S2 at time 1050. An inter-nodal block ping occurs to resolve the cache consistency problem. The cache at the first node is updated with the most current version of data block 200.
4. At time 1150, session S3 at the third node performs a write access of data block 200. At this point, the version of block 200 stored in the caches at both the first node and the second node is no longer current.
5. At time 1200, session S1 at the first node attempts another read access of block 200. In an embodiment, messages are again sent so that third node releases its write lock. A data conflict occurs between the present read access and the previous write access by session S3 at time 1150. In an embodiment, an inter-nodal block ping occurs to resolve the cache consistency problem. The cache at the first node is updated with the most current version of data block 200.

The tracing process of the present invention logs various types of information during the execution of a workload. The specific information to be recorded for any particular use of the invention will vary based upon the particular computer application/system to which the invention is directed. For example, the above description was made with the assumption that a data block is the granularity at which the example database maintains cache consistency. For certain types of systems, other granularities of data objects are utilized to maintain consistency, which will be reflected in the trace records maintained for such other granularities. As another example, note that the above description subdivides a workload based upon groups of sessions. The invention may also be instrumented to trace operations performed by other types/granularities of organizational/processing entities, e.g., by different clients, threads or processes.

Another type of information that may be logged is the mode of data access or type of data conflict detected during the workload execution. This information is useful for qualitatively determining the level of overhead associated with a detected data conflict. This is because the cost of maintaining cache consistency (e.g., the cost of a block ping) could vary depending upon the mode of access and the current state of the data object in the various nodes. For example, a database system may employ a shared-disk block ping for exclusive access operations while employing an interconnect block ping for consistent read access in a node other than the node that last modified the data object, with each block-ping having different costs. Maintaining consistency for conflicting access to a data object that has been dirtied in another node could be more expensive than resolving conflicting access to a data object that is clean in another node. Thus, the invention may be configured to track if a data object was dirty when another session makes a conflicting access. In many systems, access to temporary data, such as secondary storage used for large sort operations, do not cause cache conflicts. Thus, in those systems, false conflict identifications may be reduced by not tracing accesses to such temporary data.

The present invention also provides a method and mechanism for generating distribution plans for a workload across multiple nodes. As noted above, system performance suffers if workload execution results in an increased number of data conflicts requiring block pings to maintain cache consistency. Thus, performance improvements can be achieved by strategically allocating work in a multi-node system such that data conflicts are reduced.

Figure 4:
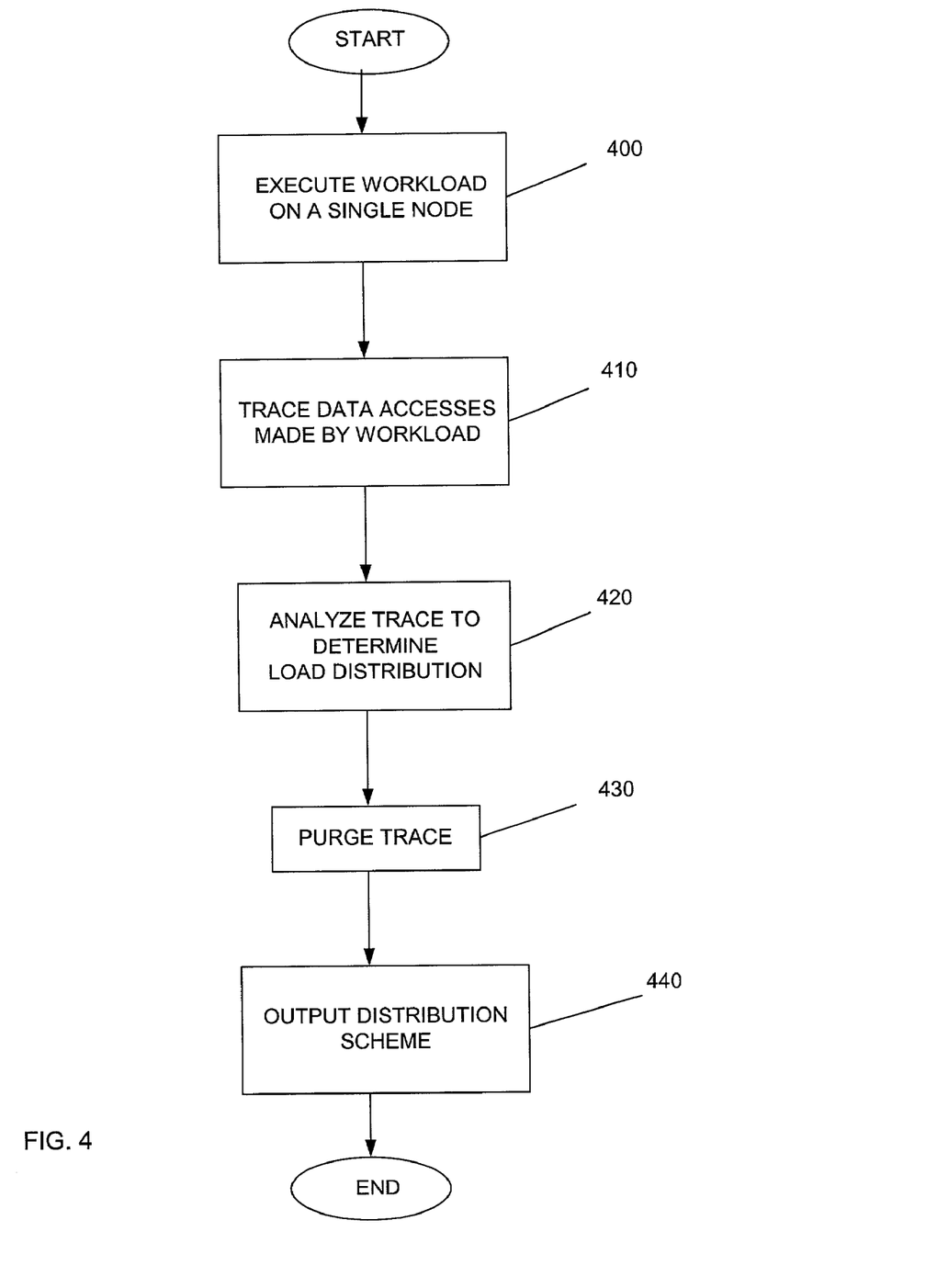
FIG. 4 depicts a flowchart of a method for generating a load distribution according to an embodiment of the invention.

FIG. 4 depicts a method for generating a load distribution plan. The method begins by executing the workload on a single node (400). At 410, the workload's data accesses are traced. At 420, the trace is analyzed to determine an advantageous load distribution scheme for the workload. At 430 and 440, the trace is purged and the distribution scheme is outputted.

The tracing process tracks a number of information elements, such as the session ID of the session making the access and the specific address or identifier of a data block. In addition, the tracing process can also track other information for a data block such as the hierarchical object corresponding to that data block, e.g., a specific table, index, or application. While a session may access many different database blocks during the execution of a workload, those database blocks often belong to a smaller set of hierarchical objects. This is particularly true in a multi-tier database architecture in which client requests are routinely routed to a database session based upon a particular request type. For example, all work requests from clients relating to a first database application A are routed to a first session $S_1$ while all work requests from clients relating to a second database application B are routed to a second session $S_2$. As the invention traces and logs data accesses by sessions during workload execution, identifiers for hierarchical objects ("Object Ids") accessed by the sessions are likewise logged.

Various methods can be employed to determine an advantageous load distribution plan. Since data conflicts may be reduced by distributing the workload such that sessions that access the same data generally execute on the same node, one method consists of grouping sessions according to the maximal intersection of the hierarchical objects accessed by the sessions in the same group and minimal intersection of the hierarchical objects accessed by sessions in different groups. For example, consider the following sample trace record:

| Session | Object ID of objects accessed |
| --- | --- |
| $S_1$ | $(O_1, O_2, O_3)$ |
| $S_2$ | $(O_1, O_2, O_3, O_4)$ |
| $S_3$ | $(O_2, O_7, O_8)$ |
| $S_4$ | $(O_7, O_8, O_9)$ |

Here, the maximal intersection of objects within the same group is achieved by grouping sessions $S_1$ and $S_2$ together and sessions $S_3$ and $S_4$ together:

Group I (sessions $S_1$ and $S_2$)=$O_1, O_2, O_3, O_4$

Group II (sessions $S_3$ and $S_4$)=$O_2, O_7, O_8, O_9$

Grouping sessions $S_1$ and $S_2$ together causes maximal intersection for Group I at intersection=$O_1, O_2, O_3$ and grouping $S_3$ and $S_4$ together causes maximal intersection for Group II at intersection=$O_7, O_8$. The minimal intersection between the groups is achieved (intersection=$O_2$). To minimize data conflicts in a 2-node system, the workload is partitioned to route all requests for sessions $S_1$ and $S_2$ to a first node and all requests for sessions $S_3$ and $S_4$ to a second node.

Sessions can be associated to specific applications or application modules that generate workload activities. Application partitioning can be used to distribute workload according to workload distribution. In a database system, the association between session identifiers and application modules (such as GL, AR, etc.) can be made through a session user name or an application defined string stored in the session. For example, with the Oracle 8i database system available from Oracle Corporation of Redwood Shores, Calif., such explicit associations can be made using the DBMS_APPLICATION_INFO packages.

Another method for determining a load distribution plan involves computing data access frequencies and using the computed frequencies to provide a weighting factor to each object when determining the load distribution scheme. This approach recognizes that not all objects should be treated equally. For purposes of explanation, assume there are N sessions ($S_1, S_2 \ldots S_n$). Further assume the existence of M objects ($O_1, O_2 \ldots O_m$). The number of accesses (both read and write) made by a session $S_i$ to an Object $O_j$ is represented by:

NACCESS($S_i, O_j$)

Once the workload is executed on a single node and the trace data has been collected for an adequate period of time, the information represented by NACCESS($S_i, O_j$) can be collated from the trace records for each session-object combination.

The maximum number of accesses made by any session to an object $O_j$ is represented by:

MAX_NACCESS($O_j$)

The value of MAX_NACCESS($O_j$) can be computed from the NACCESS($S_i$, $O_j$) information.

The smallest power of 2 that is greater than or equal to MAX_NACCESS($O_j$) for an object $O_j$ is represented by:
 NBITS_MAX_NACCESS($O_j$)
which is computed based upon the previously determined MAX_NACCESS(Oj) values. For each session $S_1 \ldots S_N$, the next step is to create a bit vector:
 BIT_VECTOR($S_i$)
having a length:
 NBITS_MAX_NACCESS($O_1$)+NBITS_MAX_NACCESS($O_2$)+
 NBITS_MAX_NACCESS($O_m$)

The following pseudocode is thereafter executed to calculate weighted correlations between sessions and objects:
 For each session $S_i$ where (1<=i<=N)
 Set BIT_VECTOR($S_i$) to zero
 For each object $O_j$ where (1<=j<=M)
  determine NBITS_NACCESS($S_i$, $O_j$) to be the smallest power of 2 that is greater than or equal to NACCESS($S_i$, $O_j$)
  Set NBITS_NACCESS($S_i$, $O_j$) bits to 1 out of NBITS_MAX_NACCESS($O_j$) starting from the least significant position At the end of the inner "For" loop, a bit vector is created which represents the weighted access of a session $S_i$ to all objects. At the end of the outer "For" loop, a bit vector is created for all the sessions.

The following pseudocode represents an additional process for grouping sessions together based upon the objects accessed by each session:
 For each session $S_i$ (1<=i<=N)
 create N-1 bit vectors AFFINITY_BIT_VECTOR($S_k$) (1<=k<=N and k !=i) as the result of BITWISE NOT of BITWISE XOR operation between BIT_VECTOR($S_i$) and BIT_VECTOR($S_k$)
 pick a bit vector MAX_AFFINITY_BIT_VECTOR($S_i$) from all AFFINITY_BIT_VECTOR($S_k$) such that MAX_AFFINITY_BIT_VECTOR($S_i$) is that AFFINITY_BIT_VECTOR($S_k$) with the greatest number of $1_s$ At the end of the FOR loop, there exists N number of MAX_AFFINITY_BIT_VECTORs which represent the best affinity that each session has with the other sessions.

The next action is to pick the MAX_AFFINITY_BIT_VECTOR that has the greatest number of 1 bits. Presume that this MAX_AFFINITY_BIT_VECTOR was the result of combining the AFFINITY_BIT_VECTORs of sessions $S_a$ and $S_b$. It can be concluded that $S_a$ and $S_b$ should run on the same node.

The next action is to drop one of the sessions $S_a$ or $S_b$ and BITOR its BIT_VECTOR to the session that is kept. The session that is kept is referred to as:
 COUPLED_SESSION At the end of this step, there remains N-1 number of sessions. The process returns back to the pseudocode for grouping sessions together based upon the objects accessed by each session, and the process actions set forth above are repeated until there remains X COUPLED_SESSIONS where X is the number of nodes in the cluster. For each of the X COUPLED_SESSIONS, it can be determined which of the original sessions contributed to the coupled session. All the sessions contributing to the coupled sessions should be executed on the same node to minimize data conflicts.

System Architecture Overview

Figure 5:
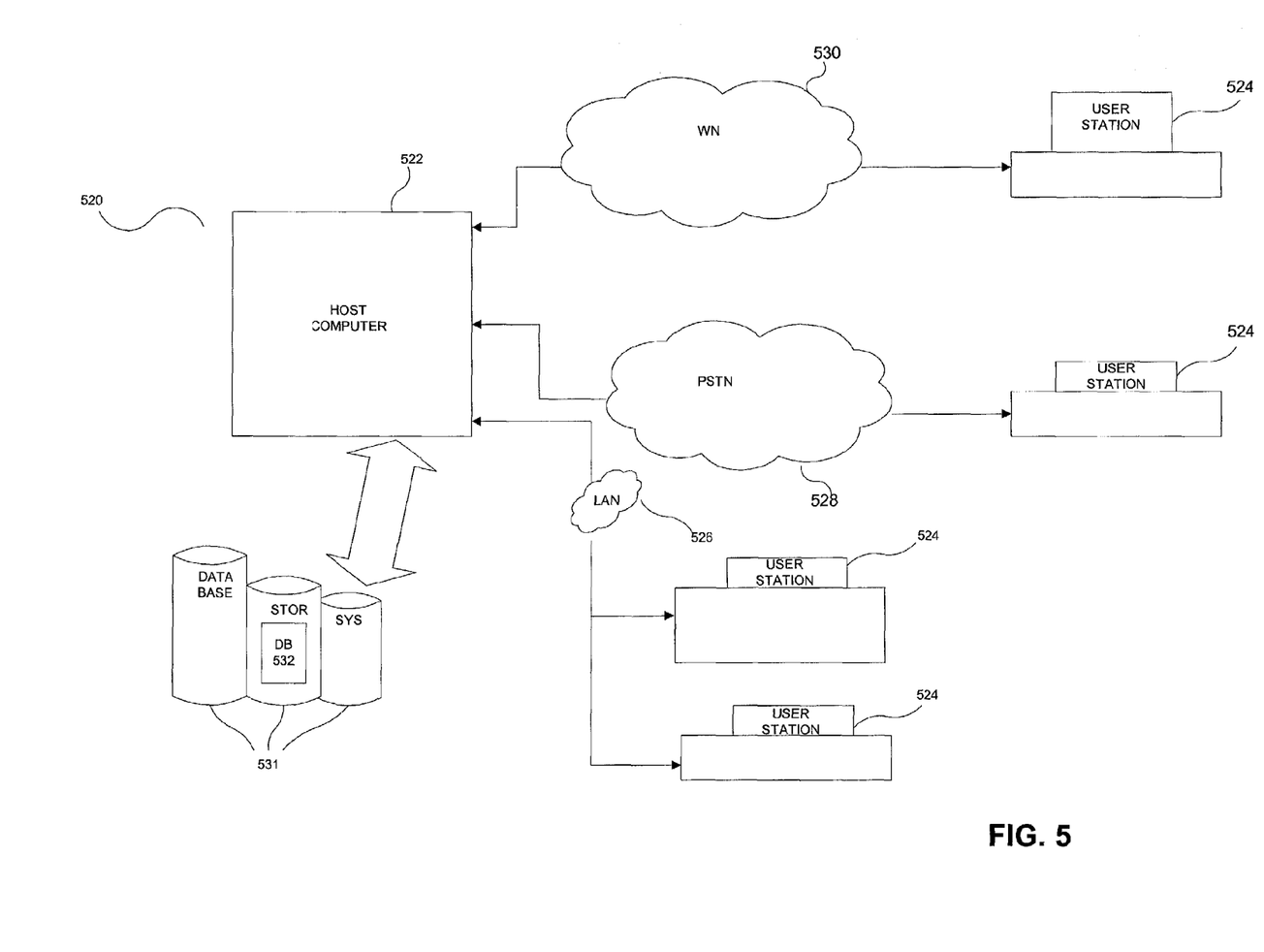
FIGS. 5 and 6 are diagrams of system architectures with which the present invention may be implemented.

Referring to FIG. 5, in an embodiment, a computer system 520 includes a host computer 522 connected to a plurality of individual user stations 524. In an embodiment, the user stations 524 each comprise suitable data terminals, for example, but not limited to, e.g., computers, computer terminals or personal data assistants ("PDAs"), which can store and independently run one or more applications. For purposes of illustration, some of the user stations 524 are connected to the host computer 522 via a local area network ("LAN") 526. Other user stations 524 are remotely connected to the host computer 522 via a public telephone switched network ("PSTN") 528 and/or a wireless network 530.

Figure 6:
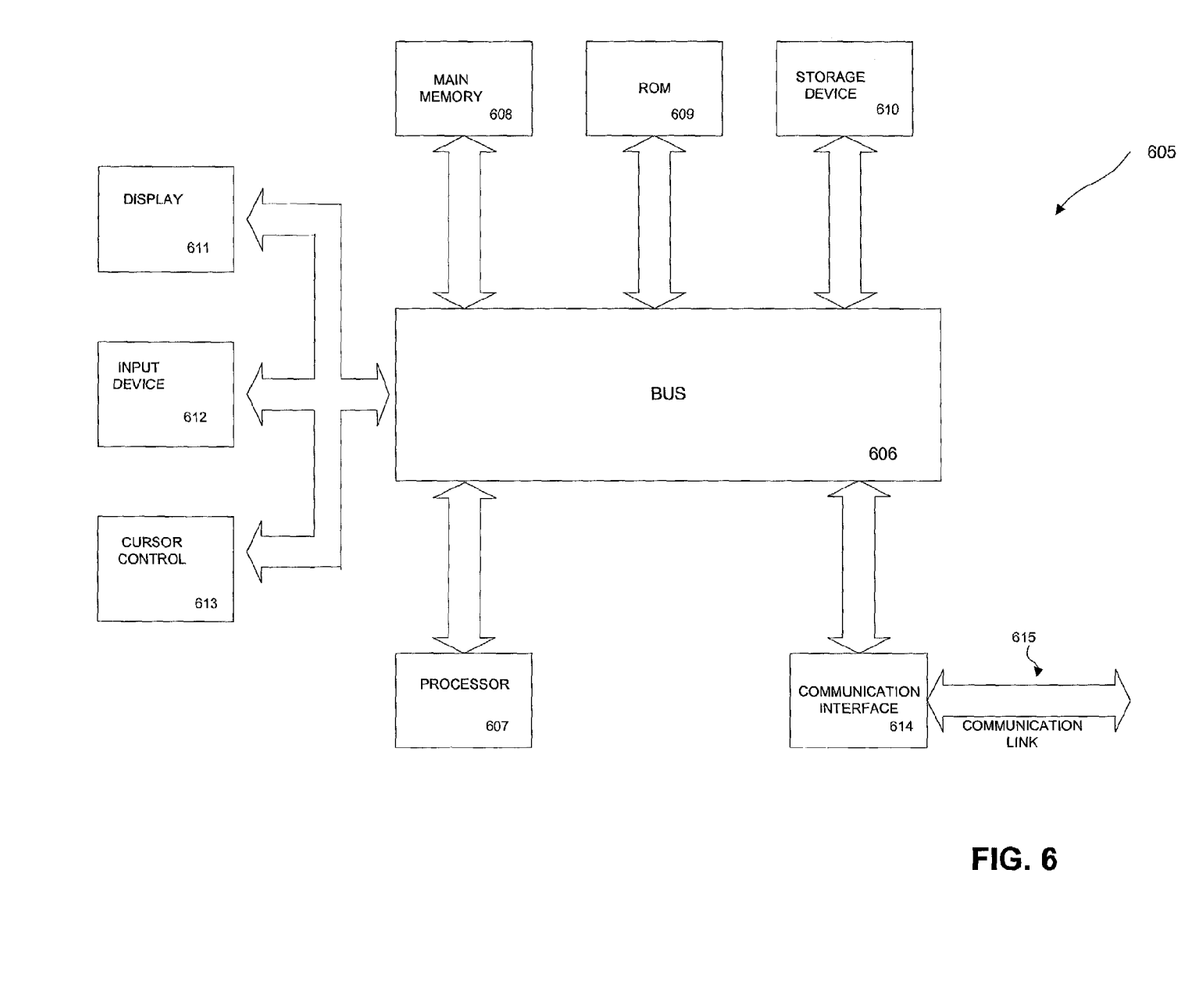

In an embodiment, the host computer 522 operates in conjunction with a data storage system 531, wherein the data storage system 531 contains a database 532 that is readily accessible by the host computer 522. In alternative embodiments, the database 532 may be resident on the host computer. In yet alternative embodiments, the database 532 may be read by the host computer 522 from any other medium from which a computer can read. In an alternative embodiment, the host computer 522 can access two or more databases 532, stored in a variety of mediums, as previously discussed. Referring to FIG. 6, in an embodiment, each user station 524 and the host computer 522, each referred to generally as a processing unit, embodies a general architecture 605. A processing unit includes a bus 606 or other communication mechanism for communicating instructions, messages and data, collectively, information, and one or more processors 607 coupled with the bus 606 for processing information. A processing unit also includes a main memory 608, such as a random access memory (RAM) or other dynamic storage device, coupled to the bus 606 for storing dynamic data and instructions to be executed by the processor(s) 607. The main memory 608 also may be used for storing temporary data, i.e., variables, or other intermediate information during execution of instructions by the processor(s) 607.

A processing unit may further include a read only memory (ROM) 609 or other static storage device coupled to the bus 606 for storing static data and instructions for the processor(s) 607. A storage device 610, such as a magnetic disk or optical disk, may also be provided and coupled to the bus 606 for storing data and instructions for the processor(s) 607. A processing unit may be coupled via the bus 606 to a display device 611, such as, but not limited to, a cathode ray tube (CRT), for displaying information to a user. An input device 612 is coupled to the bus 606 for communicating information and command selections to the processor(s) 607. A user input device may include a cursor control 613 for communicating direction information and command selections to the processor(s) 607 and for controlling cursor movement on the display 611.

According to one embodiment of the invention, the individual processing units perform specific operations by their respective processor(s) 607 executing one or more sequences of one or more instructions contained in the main memory 608. Such instructions may be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 607. Such a medium may take many forms, including, but not limited to, non-volatile, volatile and transmission media. Non-volatile media, i.e., media that can retain information in the absence of power, includes the ROM 609. Volatile media, i.e., media that can not retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 607 can retrieve information.

Various forms of computer-usable media may be involved in providing one or more sequences of one or more instructions to the processor(s) 607 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 606 may receive the infrared signals and place the instructions therein on the bus 606. The bus 606 may carry the instructions to the main memory 608, from which the processor(s) 607 thereafter retrieves and executes the instructions. The instructions received by the main memory 608 may optionally be stored on the storage device 610, either before or after their execution by the processor(s) 607.

Each processing unit may also include a communication interface 614 coupled to the bus 606. The communication interface 614 provides two-way communication between the respective user stations 524 and the host computer 522. The communication interface 614 of a respective processing unit transmits and receives electrical, electromagnetic or optical signals that include data streams representing various types of information, including instructions, messages and data. A communication link 615 links a respective user station 524 and a host computer 522. The communication link 615 may be a LAN 526, in which case the communication interface 614 may be a LAN card. Alternatively, the communication link 615 may be a PSTN 528, in which case the communication interface 614 may be an integrated services digital network (ISDN) card or a modem. Also, as a further alternative, the communication link 615 may be a wireless network 530. A processing unit may transmit and receive messages, data, and instructions, including program, i.e., application, code, through its respective communication link 615 and communication interface 614. Received program code may be executed by the respective processor(s) 607 as it is received, and/or stored in the storage device 610, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for predicting the behavior of a workload across a plurality of nodes, the method comprising:
    a) receiving a workload to be executed;
    b) executing the workload on a single node before the workload is sent to a plurality of nodes for execution, wherein at least part of the act of executing is performed using a processor;
    c) tracing the execution of the workload on the single node to identify a potential data conflict, wherein the potential data conflict comprises a potential conflict in the data, and is for computing costs of migrating the workload to a distributed system, and wherein the act of identifying potential data conflicts comprises predicting how many data conflicts will occur;
    d) based on a result of the tracing, predicting the behavior of the workload across the plurality of nodes; and
    e) outputting the prediction.

2. The method of claim 1 wherein the action of identifying potential data conflicts comprise predicting types of data conflicts.

3. The method of claim 2 in which the types of data conflicts comprises a read-write conflict.

4. The method of claim 2 in which the types of data conflicts are based upon types of operations needed to resolve the data conflicts.

5. The method of claim 2 in which the different types of data conflicts have differing levels of expense associated with operations needed for data conflict resolution.

6. The method of claim 1 in which the potential data conflicts are at the granularity of a data block.

7. The method of claim 1 in which the potential data conflicts are identified based upon workload division between sessions.

8. The method of claim 1 further comprising:
    f) selecting a number of nodes;
    g) dividing the traced execution of the workload across the number of nodes.

9. The method of claim 8 in which modulo division is used to divide the traced execution of the workload across the number of nodes.

10. The method of claim 8 in which the number of nodes corresponds to an anticipated number of nodes for a distributed computing system.

11. The method of claim 8 in which a modulo class represents a node in the number of nodes.

12. The method of claim 1, wherein the potential conflict in the data involves a block ping.

13. A method for distributing a workload across a plurality of nodes, the method comprising:
    a) receiving a workload to be executed;
    b) executing the workload on a single node before the workload is sent to a plurality of nodes for execution, wherein at least part of the act of executing is performed using a processor;
    c) tracing the execution of the workload on the single node to identify a potential data conflict, wherein the potential data conflict comprises a potential conflict in the data, and is for computing costs of migrating the workload to a distributed system, and wherein the act of identifying potential data conflicts comprises predicting how many data conflicts will occur;

d) based on a result of the tracing, forming a workload distribution scheme that distributes the workload across the plurality of nodes; and e) outputting the workload distribution scheme.

14. The method of claim 13, wherein the forming the workload distribution scheme comprises determining workload distribution in manner which reduces the potential data conflicts.

15. The method of claim 13, wherein the workload distribution scheme is based upon data accesses.

16. The method of claim 15 in which the workload is grouped in the workload distribution scheme to maximize intersection of data access on a same group of nodes.

17. The method of claim 15 in which the workload is grouped in the workload distribution scheme to minimize intersection of data access across different groups of nodes.

18. The method of claim 13, wherein the workload distribution scheme is based upon access frequencies.

19. The method of claim 18 in which data objects accessed by the workload are associated with weighting factors.

20. The method of claim 19 in which not all the data objects are associated with same weighting factors.

21. The method of claim 19 in which a weighted correlation is performed between the data objects and entities that access the data objects.

22. The method of claim 21 in which the entities that access the data objects comprises sessions.

23. The method of claim 21 in which subsets of the entities that access the data objects are grouped together.

24. The method of claim 23 in which a data structure is employed to represent an affinity between one of the entities that access the data objects and another of the entities.

25. The method of claim 13 in which the workload comprises data access upon one or more hierarchical objects.

26. The method of claim 25 in which tracing the execution of the workload comprises tracing identifiers for the one or more hierarchical objects.

27. The method of claim 13 in which tracing the execution of the workload comprises tracing identifiers associated with entities that access data.

28. The method of claim 27 in which the entities comprise sessions.

29. The method of claim 27 in which the workload distribution scheme distributes the workload based upon partitioning of the entities that access data.

30. The method of claim 29 in which an association is formed between partitioning of the entities that access data and partitioning of one or more applications within the workload.

31. The method of claim 13, wherein the potential conflict in the data involves a block ping.

32. A computer program product that includes a non-transitory computer-useable medium usable by a processor, the medium comprising a sequence of instructions which, when executed by said processor, causes said processor to execute a process for optimizing the distribution of a workload across a plurality of nodes, the process comprising:

a) receiving a workload to be executed;

b) executing the workload on a single node before the workload is sent to a plurality of nodes for execution;

c) tracing the execution of the workload on the single node to identify a potential data conflict, wherein the potential data conflict comprises a potential conflict in the data, and is for computing costs of migrating the workload to a distributed system, and wherein the act of identifying potential data conflicts comprises predicting how many data conflicts will occur;

d) based on a result of the tracing, optimizing the distribution of the workload across the plurality of nodes; and e) outputting the optimized distribution scheme.

33. The computer program product of claim 32, wherein the action of identifying potential data conflicts comprise predicting types of data conflicts.

34. The computer program product of claim 32 in which the potential data conflicts are at the granularity of a data block.

35. The computer program product of claim 32 in which the potential data conflicts are identified based upon workload division between sessions.

36. The computer program product of claim 32, wherein the potential conflict in the data involves a block ping.

37. A computer program product that includes a non-transitory computer-useable medium usable by a processor, the medium comprising a sequence of instructions which, when executed by said processor, causes said processor to execute a process for distributing a workload across a plurality of nodes, the process comprising:

a) receiving a workload to be executed;

b) executing the workload on a single node before the workload is sent to a plurality of nodes for execution;

c) tracing the execution of the workload on the single node to identify a potential data conflict, wherein the potential data conflict comprises a potential conflict in the data, and is for computing costs of migrating the workload to a distributed system, and wherein the act of identifying potential data conflicts comprises predicting how many data conflicts will occur;

d) based on a result of the tracing, forming a workload distribution scheme that distributes the workload across the plurality of nodes; and e) outputting the workload distribution scheme.

38. The computer program product of claim 37, wherein the forming the workload distribution scheme comprises determining workload distribution in manner which reduces the potential data conflicts.

39. The computer program product of claim 37, wherein the workload distribution scheme is based upon data accesses.

40. The computer program product of claim 37, wherein the workload distribution scheme is based upon access frequencies.

41. The computer program product of claim 37 in which the workload comprises data access upon one or more hierarchical objects.

42. The computer program product of claim 37 in which tracing the execution of the workload comprises tracing identifiers associated with entities that access data.

43. The computer program product of claim 37, wherein the potential conflict in the data involves a block ping.

44. A system for distributing a workload across a plurality of nodes, comprising:

a) means for receiving a workload to be executed;

b) means for executing the workload on a single node before the workload is sent to a plurality of nodes for execution, wherein the means for executing comprises a processor;

c) means for tracing the execution of the workload on the single node to identify a potential data conflict, wherein the potential data conflict comprises a potential conflict in the data, and is for computing costs of migrating the workload to a distributed system, and wherein the means for tracing is configured to predict how many data conflicts will occur;

d) means for, based on a result of the tracing, forming a workload distribution scheme that distributes the workload across the plurality of nodes; and e) means for outputting the workload distribution scheme.

45. The system of claim 44, wherein the means for forming the workload distribution scheme comprises means for determining workload distribution in manner which reduces the potential data conflicts.

46. The system of claim 44, wherein the workload distribution scheme is based upon data accesses.

47. The system of claim 44, wherein the workload distribution scheme is based upon access frequencies.

48. The system of claim 44 in which the workload comprises data access upon one or more hierarchical objects.

49. The system of claim 44 in which the means for tracing the execution of the workload comprises means for tracing identifiers associated with entities that access data.

50. The system of claim 44, wherein the potential conflict in the data involves a block ping.

51. A system for optimizing the distribution of a workload across a plurality of nodes, comprising:

a) means for receiving a workload to be executed;

b) means for executing the workload on a single node before the workload is sent to a plurality of nodes for execution, wherein the means for executing comprises a processor;

c) means for tracing the execution of the workload on the single node to identify a potential data conflict, wherein the potential data conflict comprises a potential conflict in the data, and is for computing costs of migrating the workload to a distributed system, and wherein the means for tracing is configured to predict how many data conflicts will occur;

d) means for optimizing the distribution of the workload across the plurality of nodes based on a result of the tracing; and e) means for outputting the optimized distribution scheme.

52. The system of claim 51, wherein the means for tracing is configured to predict types of data conflicts.

53. The system of claim 51, wherein the potential conflict in the data involves a block ping.

54. A computer program product that includes a non-transitory computer-useable medium usable by a processor, the medium comprising a sequence of instructions which, when executed by said processor, causes said processor to execute a process for predicting the behavior of a workload across a plurality of nodes, the process comprising:

a) receiving a workload to be executed;

b) executing the workload on a single node before the workload is sent to a plurality of nodes for execution;

c) tracing the execution of the workload on the single node to identify a potential data conflict, wherein the potential data conflict comprises a potential conflict in the data, and is for computing costs of migrating the workload to a distributed system, and wherein the act of identifying potential data conflicts comprises predicting how many data conflicts will occur;

d) based on a result of the tracing, predicting the behavior of the workload across the plurality of nodes; and e) outputting the prediction.

55. The computer program product of claim 54 wherein the action of identifying potential data conflicts comprises predicting types of data conflicts.

56. The computer program product of claim 54 in which the potential data conflicts are identified based upon workload division between sessions.

57. The computer program product of claim 54, wherein the potential conflict in the data involves a block ping.

58. A system for predicting the behavior of a workload across a plurality of nodes, comprising:

a) means for receiving a workload to be executed;

b) means for executing the workload on a single node before the workload is sent to a plurality of nodes for execution, wherein the means for executing comprises a processor;

c) means for tracing the execution of the workload on the single node to identify a potential data conflict, wherein the potential data conflict comprises a potential conflict in the data, and is for computing costs of migrating the workload to a distributed system, and wherein the means for tracing is configured to predict how many data conflicts will occur;

d) means for, based on a result of the tracing, predicting the behavior of the workload across the plurality of nodes; and e) means for outputting the prediction.

59. The system of claim 58 wherein the means for tracing is configured to predict types of data conflicts.

60. The system of claim 58 in which the means for tracing is configured to identify the potential data conflicts based upon workload division between sessions.

61. The system of claim 58, wherein the potential conflict in the data involves a block ping.

62. A method for optimizing the distribution of a workload across a plurality of nodes, the method comprising:

a) receiving a workload to be executed;

b) executing the workload on a single node before the workload is sent to a plurality of nodes for execution, wherein at least part of the act of executing is performed using a processor;

c) tracing the execution of the workload on the single node to identify a potential data conflict, wherein the potential data conflict comprises a potential conflict in the data, and is for computing costs of migrating the workload to a distributed system, and wherein the act of identifying potential data conflicts comprises predicting how many data conflicts will occur;

d) based on a result of the tracing, optimizing the distribution of the workload across the plurality of nodes; and e) outputting the optimized distribution scheme.

63. The method of claim 62, wherein the action of identifying potential data conflicts comprise predicting types of data conflicts.

64. The method of claim 62 in which the potential data conflicts are at the granularity of a data block.

65. The method of claim 62 in which the potential data conflicts are identified based upon workload division between sessions.

66. The method of claim 62, wherein the potential conflict in the data involves a block ping.

\* \* \* \* \*